Patented Mar. 15, 1932

1,849,988

UNITED STATES PATENT OFFICE

HARRY C. MOORE, OF CHICAGO, ILLINOIS, ASSIGNOR TO ARMOUR FERTILIZER WORKS, OF CHICAGO, ILLINOIS, A CORPORATION OF NEW JERSEY

METHOD OF PREPARING FERTILIZER MIXTURES

No Drawing.    Application filed February 1, 1929.    Serial No. 336,920.

The present invention relates to improved mixed fertilizers and their novel methods of manufacture, its principal objects being a superior physical condition of the fertilizer with more uniform distribution of the fertilizer ingredients throughout the mixture, and the maintenance of the total plant food in the constituents practically unimpaired from the standpoints of quantity and availability, and it concerns more specifically the addition of one or more mineral acids, such as phosphoric, nitric, or sulphuric acid, to one or more other materials of fertilizer value, and after mixing all of these ingredients together, adding ammonia, preferably by means of a liquid containing ammonia, either as ammonia liquor or liquid anhydrous ammonia.

According to the present practice of making fertilizer mixtures, definite amounts of various component parts, such as superphosphate, ammonium salts, nitrates and potash salts are mixed together, adding thereto some alkaline material such as lime, limestone, or cyanamid in sufficient quantity whereby the resulting mixture shall contain practically no free acid. Any undue excess of free acidity in the superphosphate or other materials used has been objectionable on account of making the mixture gummy or sticky, the difficulty of effecting a uniform distribution of the various ingredients throughout the mixture, the necessity for neutralizing the acidity in order to produce a fertilizer mixture of good physical texture, suitable for use in fertilizer distributors, the expense of such treatment and the difficulty of producing such neutralization when using solid alkaline materials, because of the trouble in achieving a uniform distribution throughout the mixture of the small quantity of solid alkaline material required.

I have discovered, however, that, if a mineral acid, such as phosphoric acid, is mixed with one or more fertilizer materials, one of which is usually a superphosphate, in suitable proportions and a liquid containing ammonia added, preferably, though not necessarily, as liquid anhydrous ammonia, in such amount that the final mixture contains practically no free acid, a product of excellent physical condition results, which quickly cures in the storage pile to a dry-to-the-touch fertilizer, and which, after curing and disintegration, is a free-flowing fertilizer suitable for employment in ordinary fertilizer distributors.

In this process, the addition of the mineral acid to the solid fertilizer ingredients more or less moistens the latter with a thin film of the acid, and the addition of the ammonia neutralizes the free acid and seemingly coats all of the particles in the mixture with salts containing ammonium compounds, thus tending to form agglomerates and creating a more homogeneous mixture with less tendency to segregation in handling. If the mineral acid used is phosphoric acid, and the proper amount of ammonia added, salts containing an ammonium phosphate coat the particles, and as such outer layer or covering is relatively non-hygroscopic, the entire mass is rendered less hygroscopic by this process, thus lessening the tendency of the fertilizer mixture to pack or cake in the bags after shipment.

By the method herein set forth, the soluble fertilizer material formed by the action of the acid and the ammonia is not only absorbed on the surface of other materials present in the fertilizer mixture but also enters and in some degree is formed in the pores of these other materials. This is not only a great advantage in increasing the homogeneity of the fertilizer mixture but it has an additional benefit in that water soluble constituents of the fertilizer mixture do not leach out from a mixture so formed as rapidly when it is applied to the soil.

This method of making fertilizer mixtures may, therefore, be advantageously applied to special types of fertilizer where it is desired to obtain a quick action on the plants by the use of water soluble fertilizing materials. For example, in such cases there might be added as a chief constituent of such a fertilizer mixture, such material as sawdust or dried peat or peat moss (materials which have minor fertilizing value and which are used in soils principally because of their humus value) and by my process a soluble fertilizer would be deposited in the pores of such an inert material and would become available sufficiently quickly to the plant, but would not leach out in the soil as rapidly as a similar soluble fertilizer material not prepared by my improved method.

Other mineral acid, such as sulphuric, may be used or a mixture of acids such as phosphoric and sulphuric, or phosphoric and nitric, may be employed and, in the case of mixed acids, double salts containing ammonia are probably formed, and, when suitable proportions of the mixed acids and ammonia are used, relatively non-hygroscopic stable mixtures result.

By this method a more uniform distribution of the several ingredients throughout the mass is obtained than when only solid materials are used in the mixture.

According to one preferred method of practicing this process, the fertilizer materials, such as superphosphate, potassium chloride or sulphate, ammonium sulphate, sodium nitrate, Leunasalpeter, etc., in any suitable proportions are introduced into a standard fertilizer batch mixer, and, while being mixed therein, are subjected to a spray or stream of a mineral acid, such as phosphoric acid, in suitable amount, and finally further treated with a spray or stream of a liquid containing ammonia, preferably liquid anhydrous ammonia in appropriate quantity to accomplish the above stated results. The fertilizer prepared as above and discharged from the mixer all in a few minutes, is warm, the free acid having been almost immediately neutralized, the mixture containing practically no free acid, and rapidly curing of itself frequently in a few hours without further treatment to a dry-to-the-touch fertilizer, which, after being disintegrated, is in practically free-flowing condition.

The substantial permanency of the uniformity of the product is promoted by reason of the fact that it is largely prevented from segregation into parts of different physical characteristics, due in a measure to chemical reaction between the ammonia and the acidic materials, in part to the deposit of salts on other particles of the mixture, and in part to agglutination of particles, thus causing a chemical union and mechanical locking of particles sufficiently to render the mixture as a whole of more unvarying character, in a large measure precluding separation or division into portions or sections of different physical properties.

Another advantage of this process is the practicability of producing a more concentrated fertilizer mixture than is usual, which is made possible, especially if phosphoric acid is the mineral acid employed and the ammonia added in the form of liquid anhydrous ammonia, on account of the use of these highly concentrated fertilizer materials.

An added benefit is that by this process the employment of a larger quantity of ammonia, either as ammonia liquor or liquid anhydrous ammonia, is made possible, and at the present time these materials furnish the cheapest form of nitrogen for use in fertilizers.

As an example of the amounts of ingredients which may be satisfactorily employed in practicing this novel process, the following is submitted:

1200 pounds high grade superphosphate
100 pounds phosphoric acid solution, containing preferably about 50% $P_2O_5$
60 pounds liquid anhydrous ammonia
200 pounds Leunasalpeter
440 pounds muriate of potash.

Preferably all of these constituents are mixed together except the ammonia which is introduced last, although it can be added simultaneously with the mixture of the other parts.

It will be understood, of course, that the above is only an example of one fertilizer mixture which may be made by my process, and it will be appreciated that many other mixtures of widely varying compositions may be made by and have the advantage of my process according to commercial needs. The mineral acid used may vary considerably in its strength or concentration according to the conditions in mixtures and other materials used therewith.

By a fertilizer containing no free acid is meant one which, when tested with methyl orange indicator in a water solution of the fertilizer, shows no acid reaction, this being a common practice in the fertilizer industry.

Those skilled in this art will know that the invention is not necessarily limited and restricted to the precise and exact details presented and that these may be modified within comparatively wide limits without departure from the heart and essence of the invention as defined by the appended claims and without the loss or sacrifice of any of its material benefits and advantages.

I claim:

1. The method of making a fertilizer having agglomerated particles and containing practically no free acid, consisting in substantially uniformly agitating together for a few minutes ground solid superphosphate containing free acid, other solid water-soluble fertilizer compound, mineral acid in addition to that of said superphosphate, and an ammoniacal liquid of such strength and in such amount as at least substantially to neutralize the free acid present but restricted in amount to avoid substantial reversion of the available phosphate to unavailable form, said ammoniacal liquid and mineral acid in co-operation with the other ingredients being adequate to produce a sufficiently moist mixture to cause agglomeration of its particles but restricted in amount to insure a product capable upon cooling of becoming dry-to-the-touch.

2. The method of making a fertilizer having agglomerated particles and containing practically no free acid, consisting in substantially uniformly agitating together for a few minutes ground solid superphosphate containing free acid, a fertilizer potassium salt, mineral acid in addition to that of said superphosphate, and an ammoniacal liquid of such strength and in such amount as at least substantially to neutralize the free acid present but restricted in amount to avoid subsantial reversion of the available phosphate to unavailable form, said ammoniacal liquid and mineral acid in co-operation with the other ingredients being adequate to produce a sufficiently moist mixture to cause agglomeration of its particles but restricted in amount to insure a product capable upon cooling of becoming dry-to-the-touch.

3. The method of making a fertilizer having agglomerated particles and containing practically no free acid, consisting in substantially uniformly agitating together for a few minutes ground solid superphosphate containing free acid, a fertilizer potassium salt, a water-soluble nitrogen-bearing compound, mineral acid in addition to that of said superphosphate, and ammoniacal liquid of such strength and in such amount as at least substantially to neutralize the free acid present but restricted in amount to avoid substantial reversion of the available phosphate to unavailable form, said ammoniacal liquid and mineral acid in co-operation with the other ingredients being adequate to produce a sufficiently moist mixture to cause agglomeration of its particles but restricted in amount to insure a product capable upon cooling of becoming dry-to-the-touch.

4. The method of making a fertilizer having agglomerated particles and containing practically no free acid, consisting in substantially uniformly agitating together for a few minutes ground solid superphosphate containing free acid, other solid water-soluble fertilizer compound, a plurality of mineral acids in addition to the acid of said superphosphate, and an ammoniacal liquid of such strength and in such amount as at least substantially to neutralize the free acid present but restricted in amount to avoid substantial reversion of the available phosphate to unavailable form, said ammoniacal liquid and mineral acids in co-operation with the other ingredients being adequate to produce a sufficiently moist mixture to cause agglomeration of its particles but restricted in amount to insure a product capable upon cooling of becoming dry-to-the-touch.

5. The method of making a fertilizer having agglomerated particles and containing practically no free acid, consisting in substantially uniformly agitating together for a few minutes approximately twelve hundred pounds of superphosphate, approximately one hundred pounds phosphoric acid solution containing about fifty per cent. $P_2O_5$, approximately sixty pounds liquid anhydrous ammonia, approximately two hundred pounds of Leunasalpeter, and approximately four hundred and forty pounds muriate of potash, and curing the initial moist product to secure fixing of sufficient of its contained water to produce a dry-to-the-touch product capable of disintegration into a free-flowing condition.

6. The method of making a fertilizer having agglomerated particles and containing practically no free acid, consisting in substantially uniformly agitating together for a few minutes ground solid superphosphate containing free acid, mineral acid in addition to that of said superphosphate, and anhydrous ammonia in liquid form and in such amount as at least subsubstantially to neutralize the free acid present but less in amount than that which would require added extraneous cooling of the mixture to prevent substantial reversion of the available phosphate to unavailable form, said liquid ammonia and mineral acid in co-operation with the other ingredients being adequate to produce a sufficiently moist mixture to cause agglomeration of its particles but restricted in amount to insure a product capable upon cooling of becoming dry-to-the-touch.

7. The method of making a fertilizer having agglomerated particles and containing practically no free acid, consisting in substantially uniformly agitating together for a few minutes and at substantially atmospheric pressure ground solid superphosphate containing free acid, mineral acid in addition to that of said superphosphate, and anhydrous ammonia in liquid form and in such amount as at least substantially to neutralize the free acid present but less in amount than that which would require added extraneous cooling of the mixture to prevent substantial reversion of the available phosphate to unavailable form, said liquid ammonia and mineral acid in co-operation with the other ingredients being adequate to produce a sufficiently moist mixture to cause agglomeration of its particles but restricted in amount to insure a product capable upon cooling of becoming dry-to-the-touch.

8. The method of making a fertilizer having agglomerated particles and containing practically no free acid, consisting in substantially uniformly agitating together for a few minutes ground solid superphosphate containing free acid, other solid water-soluble fertilizer, mineral acid in addition to that of said superphosphate, and anhydrous ammonia in liquid form and in such amount as at least substantially to neutralize the free acid present but less in amount than that which would require added extraneous cooling of the mixture to prevent substantial reversion of the available phosphate to unavailable form, said liquid ammonia and mineral acid in co-operation with the other ingredients being adequate to produce a sufficiently moist mixture to cause agglomeration of its particles but restricted in amount to insure a product capable upon cooling of becoming dry-to-the-touch.

9. The process of making a fertilizer having agglomerated particles and containing practically no free acid, consisting in substantially uniformly agitating together ground solid commercial superphosphate containing free acid, mineral acid in addition to that of said superphosphate, and anhydrous ammonia in liquid form, the amount of such ammonia being at least sufficient to neutralize the free acid but less in amount than that which would require added extraneous cooling of the mixture to prevent substantial reversion of the available phosphate to unavailable form.

10. The process of making a fertilizer having agglomerated particles and containing practically no free acid, consisting in substantially uniformly agitating together for few minutes ground solid commercial superphosphate containing free acid, a nitrate, mineral acid in addition to that of said superphosphate, and anhydrous ammonia in liquid form and in such amount as at least substantially to neutralize the free acid present but restricted in amount to avoid substantial reversion of the available phosphate to unavailable form, said anhydrous ammonia and mineral acid in co-operation with the other ingredients being adequate to produce a sufficiently moist mixture to cause agglomeration of its particles but restricted in amount to insure a product capable upon cooling of becoming dry-to-the-touch.

In witness whereof I have hereunto set my hand.

HARRY C. MOORE.